(12) United States Patent
Barile

(10) Patent No.: US 6,915,261 B2
(45) Date of Patent: Jul. 5, 2005

(54) MATCHING A SYNTHETIC DISC JOCKEY'S VOICE CHARACTERISTICS TO THE SOUND CHARACTERISTICS OF AUDIO PROGRAMS

(75) Inventor: Steven E. Barile, Portland, OR (US)

(73) Assignee: Intel Corporation, Santa Clara, CA (US)

(*) Notice: Subject to any disclaimer, the term of this patent is extended or adjusted under 35 U.S.C. 154(b) by 787 days.

(21) Appl. No.: 09/809,017

(22) Filed: Mar. 16, 2001

(65) Prior Publication Data
US 2002/0133349 A1 Sep. 19, 2002

(51) Int. Cl.[7] .............................................. G10L 21/00
(52) U.S. Cl. ...................................... 704/265; 704/272
(58) Field of Search ................................ 704/258, 265, 704/267, 268, 270, 272, 260; 84/477 R; 434/307 A (56) References Cited

U.S. PATENT DOCUMENTS

| | | | |
|---|---|---|---|
| 3,828,132 A | 8/1974 | Flanagan et al. | |
| 5,327,521 A * | 7/1994 | Savic et al. | 704/272 |
| 5,384,893 A * | 1/1995 | Hutchins | 704/267 |
| 5,749,073 A | 5/1998 | Slaney | |
| 5,751,906 A | 5/1998 | Silverman | |
| 5,915,237 A | 6/1999 | Boss et al. | |
| 5,986,199 A * | 11/1999 | Peevers | 84/603 |
| 6,344,607 B2 | 2/2002 | Cliff | |
| 6,591,240 B1 * | 7/2003 | Abe | 704/278 |
| 2004/0074377 A1 | 4/2004 | Georges | |

* cited by examiner

Primary Examiner—Susan McFadden
(74) Attorney, Agent, or Firm—Sharmini N. Green (57) ABSTRACT

A system and method for matching voice characteristics of a synthetic disc jockey are presented. A first segment of audio signal and a second segment of audio signal are received by a sound characteristic estimator. Corresponding first and second sets of sound characteristics are determined by the sound characteristic estimator. A voice characteristic transition for the disc jockey is interpolated from the first and second set of sound characteristics between a starting and an ending time.

30 Claims, 6 Drawing Sheets

MATCHING A SYNTHETIC DISC JOCKEY'S VOICE CHARACTERISTICS TO THE SOUND CHARACTERISTICS OF AUDIO PROGRAMS

BACKGROUND

1. Field

This invention relates in general to signal processing. Specifically, this invention relates to systems and methods for varying sound characteristics used by text-to-speech engines.

2. General Background and Related Art

A human disc jockey (DJ) makes announcements between previous and subsequent audio programs, such as songs. A DJ may vary the sound characteristics of the DJ's voice during the announcement such that the announcement begins with sound characteristics consistent with those of the previous song and ends with sound characteristics consistent with those of the upcoming song. Smooth transitions between songs and DJ announcements may improve the audio effect upon the listener.

In the digital era, it is becoming increasingly popular to employ text-to-speech (TTS) engines to perform the conventional tasks of a human DJ. That is, a human DJ may be replaced by a synthetic DJ that synthesizes an audio announcement based on the text of the announcement. For example, titles of songs may be inputted, in textual form, to a TTS-based synthetic DJ. Based on given titles, the synthetic DJ may then generate appropriate audio signals for the announcement. Nevertheless, synthetic DJ technologies apply a constant set of sound characteristics when synthesizing announcements. This failure to consider context yields unnatural-sounding announcements.

Therefore, what is needed is a system and method that adjusts synthetic DJ sound characteristics depending on the context of an announcement.

DETAILED DESCRIPTION

The following detailed description refers to the accompanying drawings that illustrate exemplary embodiments of the present inventions. Other embodiments are possible and modifications may be made to the embodiments without departing from the spirit and scope of the invention. Therefore, the following detailed description is not meant to limit the invention. Rather, the scope of the invention is defined by the appended claims.

It will be apparent to one of ordinary skill in the art that the embodiments as described below may be implemented in many different embodiments of software, firmware, and hardware in the entities illustrated in the figures. The actual software code or specialized control hardware used to implement the present invention is not limiting of the present invention. Thus, the operation and behavior of the embodiments will be described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with the presented embodiments may be stored in any storage device, such as, for example, a computer system (non-volatile) memory, an optical disk, magnetic tape, or magnetic disk. Furthermore, the processes may be programmed when the computer system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer.

A system and method for matching voice characteristics of a disc jockey, as described herein, employs a sound characteristic estimator. A first segment of audio signal is received by the sound characteristic estimator. A corresponding first set of sound characteristics is then determined by the sound characteristic estimator. Similarly, a second segment of audio signal is received by the sound characteristic estimator, and a second set of sound characteristics is determined thereby. A voice characteristic transition for the disc jockey is then interpolated from the first set of sound characteristics to the second set of sound characteristics between a starting time and an ending time.

Figure 1:
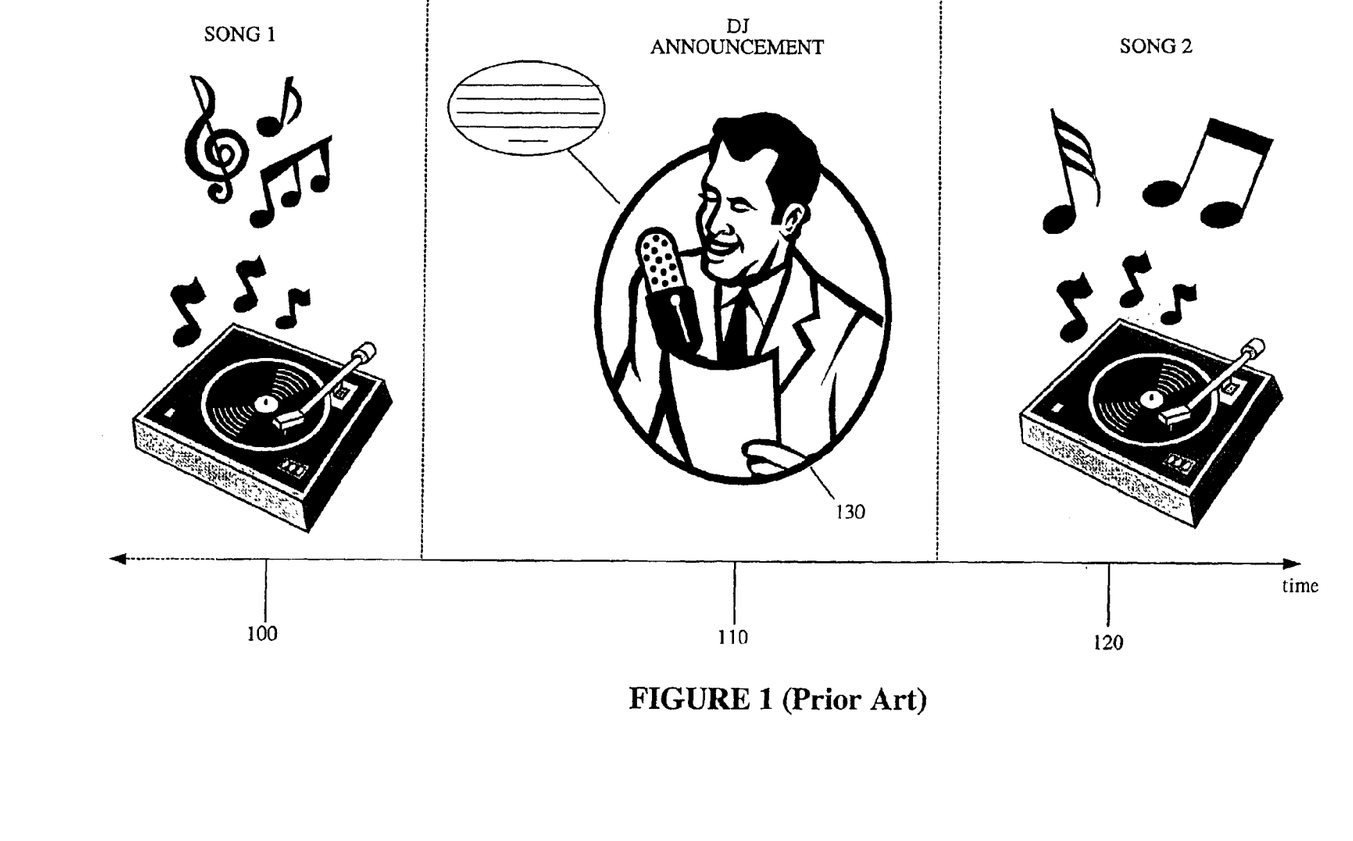
FIG. 1 (Prior Art) illustrates timings in a disc jockey setting.

FIG. 1 (Prior Art) illustrates timings in a radio setting involving a human disc jockey (DJ) 130. In first time slot 100, song 1 plays over the airwaves. Then, in time slot 110, DJ 130 makes a DJ announcement. This announcement may comprise a transitional message, wherein DJ 130 makes a reference to song 1 and introduces song 2, which disc jockey 130 intends to play. In time slot 120, song 2 plays.

Figure 2:
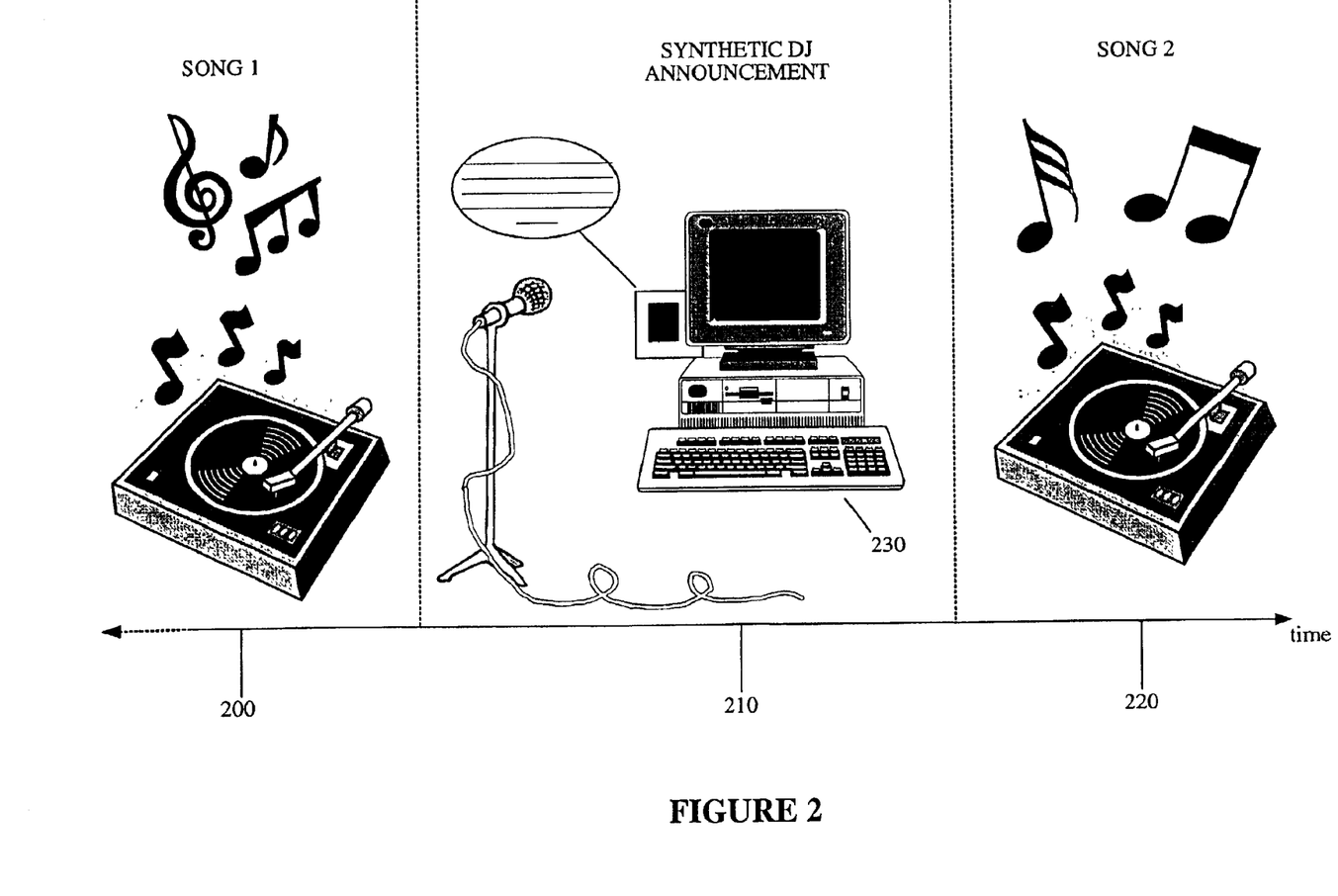
FIG. 2 illustrates timings in a synthetic disc jockey setting.

In FIG. 2, disc jockey 130 of FIG. 1 is replaced by a synthetic disc jockey 230. Synthetic disc jockey 230 may comprise a voice synthesis mechanism, such as a computer, that synthetically produces human speech. Therefore, in FIG. 2, song 1 plays during time slot 200, synthetic disc jockey 230 makes a synthetic disc jockey announcement in time slot 210, and song 2 plays during time slot 220. The timings of FIG. 2 may also apply to other settings, such as television, the Internet, jukebox, karaoke, and automated public-address system (PA) settings, wherein a person speaks within an interval between audio segments. It is to be noted that any programming may be broadcast in either of time slots 200, 220, such as advertisements, recorded news segments, or sports programs.

Figure 3:
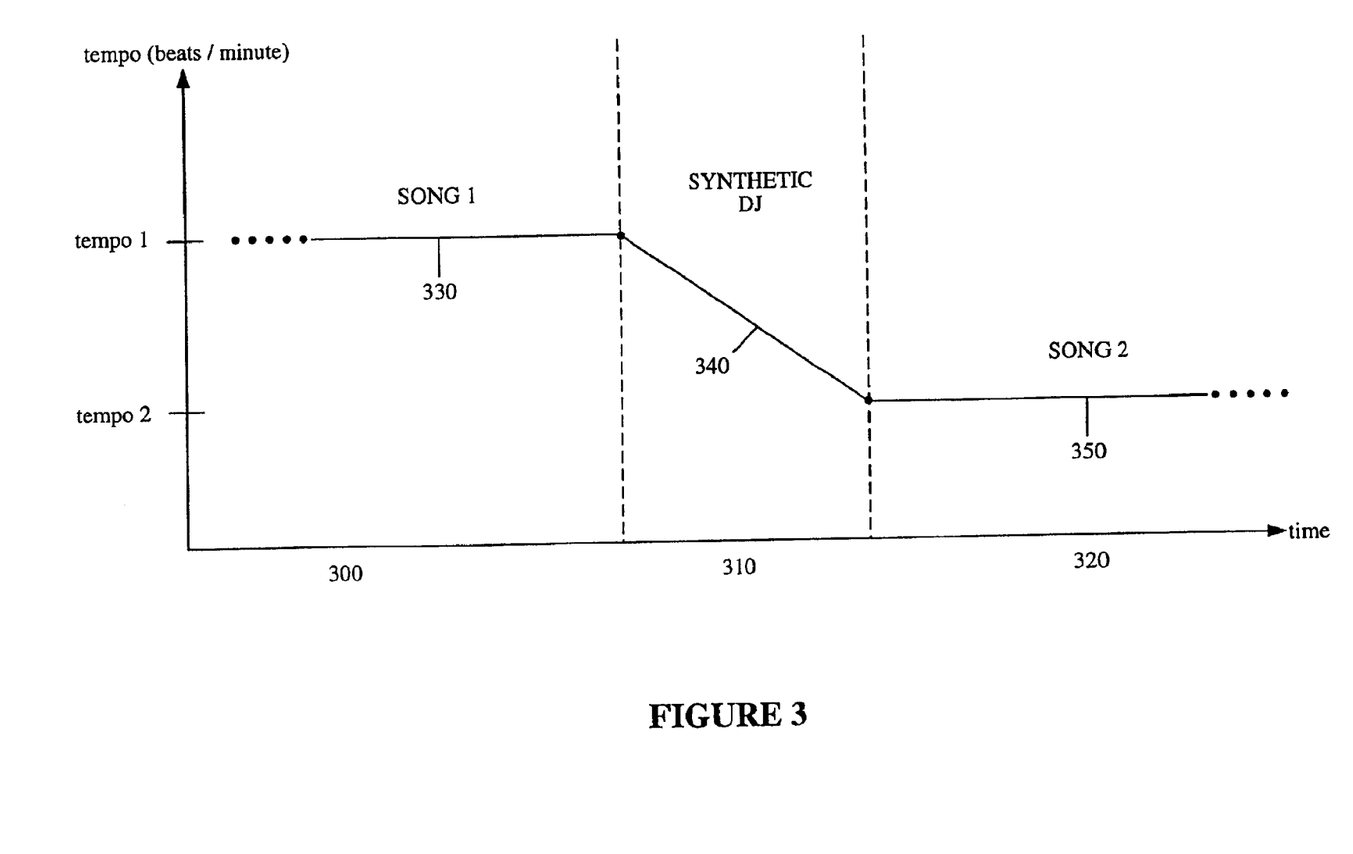
FIG. 3 is a graph showing a voice characteristic transition.

FIG. 3 is a graph showing one synthetic DJ voice characteristic transition between music selections. Time is shown along the horizontal axis, and tempo, as represented by beats per minute heard by a listener, is shown along the vertical axis. In time slot 300, song 1 is heard at tempo 1, as shown by line 330. In time slot 310, a synthetic disc jockey begins to speak at a first speaking rate and gradually reduces the speaking rate, as shown by transition curve 340. Song 2 plays at tempo 2, as shown by line 350.

In the example of FIG. 3, transition curve 340 is shown to be linearly decreasing. However, transition curve 340 may be nonlinear; humans typically vary their speaking rate.

Further, lines 330 and 350 may represent average beats per minute of all or a portion of songs 1 and 2, respectively. Transition curve 340 need not begin and end at tempo 1 and 2, respectively. A mapping from the tempo of the songs to speaking rate of spoken language may be employed. It is to be noted that graphs similar to that shown in FIG. 3 may be drawn for other sound characteristics besides tempo.

Figure 4:
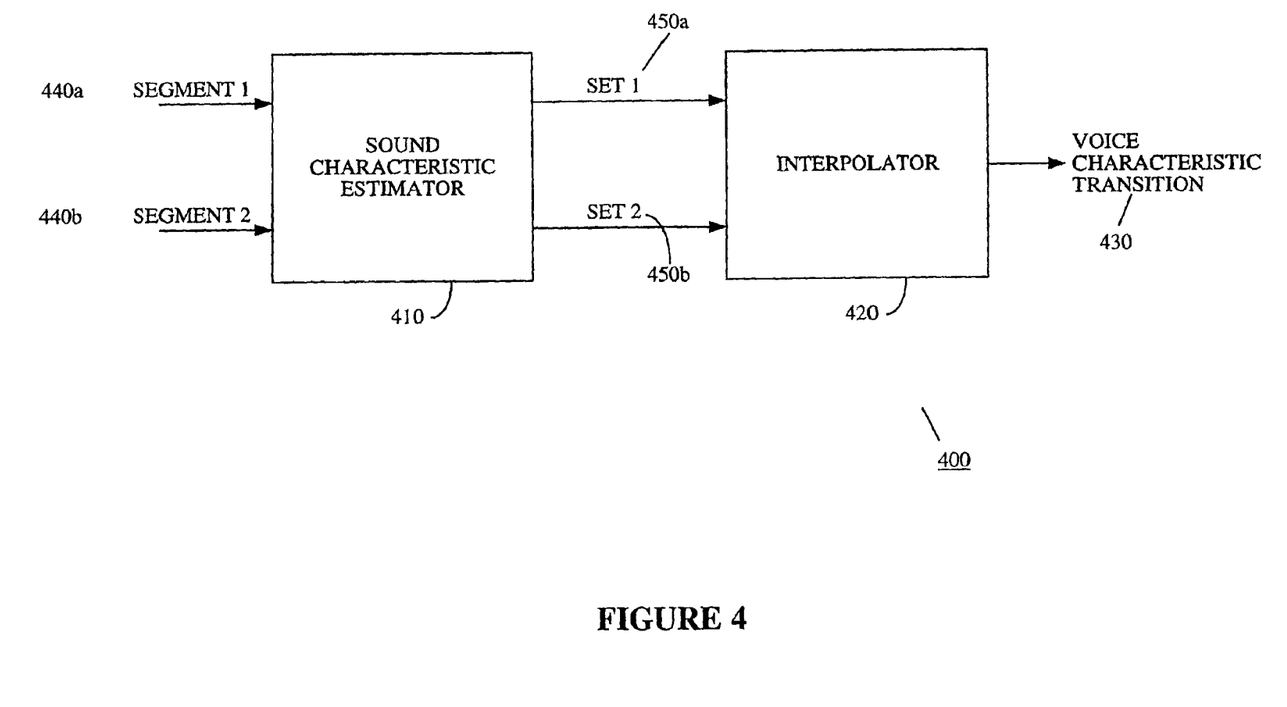
FIG. 4 is a block diagram of a system according to an embodiment of the present invention.

FIG. 4 is a block diagram of system 400, constructed and operative according to an embodiment of the present invention. System 400 comprises sound characteristic estimator 410 and interpolator 420. Sound characteristic estimator 410 receives as inputs a first segment of audio signal 440*a* and a second segment of audio signal 440*b*. The audio signal comprising first segment 440*a* and that comprising second segment 440*b* may be different or identical signals. An audio signal may comprise various kinds of audio, such as, for instance, music, a commercial, or a narration.

Sound characteristic estimator 410 determines a first set of audio characteristics 450*a* corresponding to first segment 440*a*, and a second set of sound characteristics 450*b* corresponding to second segment 440*b*. As such, sound characteristic estimator 410 may employ audio sampling and analysis algorithms to measure or estimate sound characteristics. Each set of sound characteristics 450*a*, 450*b* may include measures of pitch, tempo, volume, etc.

In other embodiments, sound characteristic estimator may extract identifying information from each audio signal, such as the title of a song embedded in a tag of a digital audio file. Using the title as an index, sound characteristic estimator may consult a look-up table which contains sound characteristics for the song or pointers to such sound characteristics.

Interpolator 420 receives as inputs first and second sets of sound characteristics 450*a*, 450*b*. By analyzing sets of sound characteristics 450*a*, 450*b* individually, relative to one another, or together, interpolator 420 may interpolate a voice characteristic transition 430 for a synthetic DJ.

In other embodiments, interpolator 420 may convert first and second sets of sound characteristics 450*a*, 450*b*, to a corresponding first set of voice characteristics and second set of voice characteristics (not shown). For example, an estimated tempo from an audio program may be mapped to an appropriate speaking rate. Further, an estimated pitch in a musical selection may be mapped to a prescribed level of pitch or a dynamic range of pitch in speech. The estimated volume of a musical selection may be translated into loudness of the speech. Additional voice characteristics may include average pitch or prosody (patterns of stress and intonation). In some embodiments, a look-up table may be implemented that maps sound characteristics to voice characteristics. As such, processing demands on interpolator 420 may be reduced.

Figure 5:
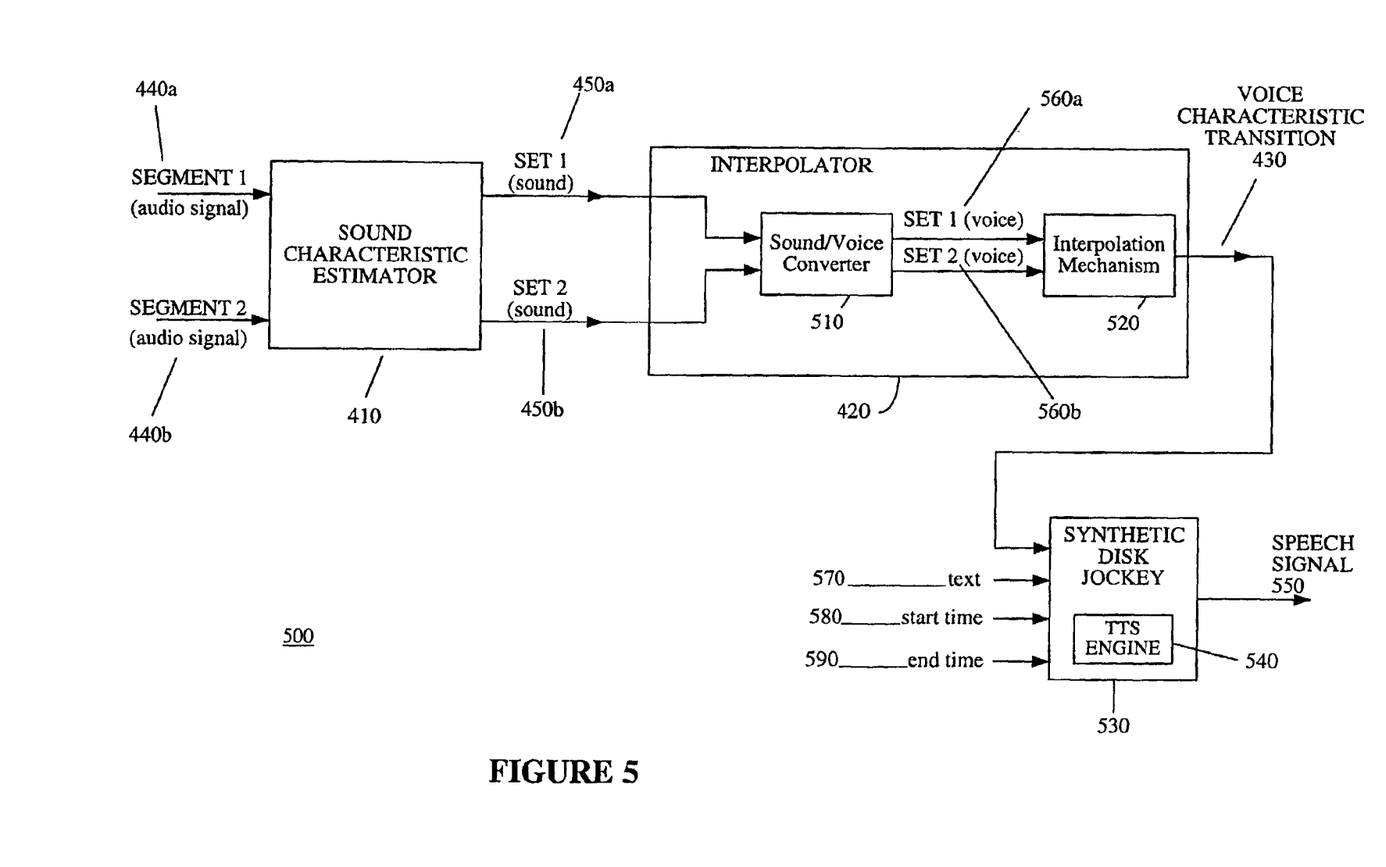
FIG. 5 is a block diagram of a system according to an embodiment of the present invention.

FIG. 5 is a block diagram of an embodiment of the present invention. System 500 comprises sound characteristic estimator 410, interpolator 420, and synthetic disc jockey 530. Sound characteristic estimator 410 is described above. Interpolator 420 may comprise a sound/voice converter 510 and an interpolator 520. Sound/voice converter 510 converts sets of sound characteristics 450*a*, 450*b*, received from sound characteristic estimator 410, to corresponding sets of voice characteristics 560*a*, 560*b*. Interpolator 520 generates an interpolation between a first and second set of voice characteristics 560*a*, 560*b*, and outputs a voice characteristic transition 430. Interpolator 520 may generate an interpolation between each voice characteristic in the first set of voice characteristics 560*a*, and its counterpart in the second set of voice characteristics 560*b*.

Synthetic disc jockey 530 may comprise a speech processing mechanism. In FIG. 5, for example, synthetic disc jockey 530 comprises text-to-speech (TTS) engine 540. TTS engine 540 may receive textual information and produce synthesized speech signals. The output of TTS engine 540 may depend on many factors; for instance, average phoneme (i.e., speech primitive) duration may be linked to speaking rate. Synthetic disc jockey 530 may receive as inputs voice characteristic transition 430, text 570, a start time 580, and an end time 590. Via TTS engine 540, synthetic disc jockey 530 may output a speech signal 550.

More specifically, voice characteristic transition 430 may be outputted by interpolator 430. Text 570 may be a text file containing text of a synthetic DJ announcement to be played between a previous and subsequent song. Start time 580 and end time 590 may correspond to actual, relative, or estimated times for a synthetic DJ announcement. Speech signal 550 may be rendered by an output mechanism, for instance, a speaker, to generate a synthetic announcement by the synthetic disc jockey 530.

In an exemplary implementation, a sample set of voice characteristics for synthetic disc jockey 530 may be chosen based on the genre of first segment of audio signal 440*a*, second segment of audio signal 440*b*, or both. For instance, if first segment 440*a* is a rock-and-roll song, a low, booming voice may be produced by synthetic disc jockey 530. On the other hand, if first segment 440*a* is a Baroque work performed by a chamber ensemble, a higher, softer voice may be produced by synthetic disc jockey 530. Similarly, a sample set of voice characteristics chosen for a sports program may differ from a sample set chosen for a news program.

In other embodiments, end time 590 may be determined based on the length of the titles of the previous and subsequent songs, the length of accompanying narrative text, and the magnitude of the difference between various sound characteristics of the previous and subsequent songs. In other embodiments, end time 590 may comprise a threshold time, wherein the speaking rate of synthetic DJ 530 is adjusted to ensure that the duration of the transition does not exceed the threshold time.

Figure 6:
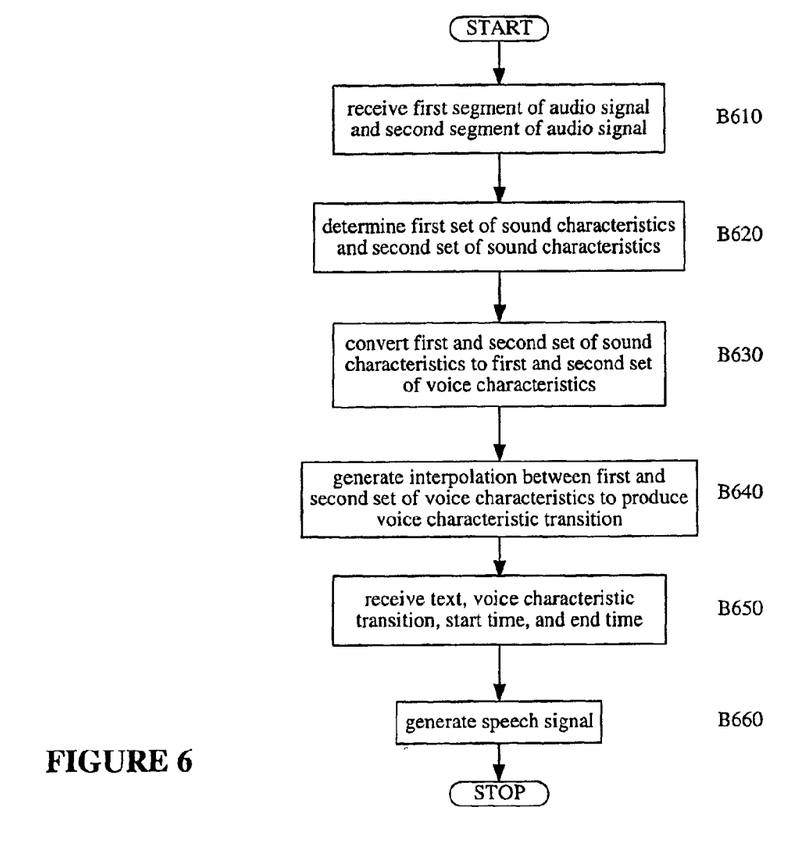
FIG. 6 is a flow diagram of a method according to an embodiment of the present invention.

FIG. 6 is a flow diagram showing a method for matching voice characteristics of a synthetic DJ in accordance with an embodiment of the present invention. In block B610, a first segment of audio signal and a second segment of audio signal are received. Then, in block B620, a first set of sound characteristics and a second set of sound characteristics respectively associated with the first and second segments of audio signal are determined. In block B630, the first and second sets of sound characteristics are converted to first and second sets of voice characteristics, respectively. In block B640, an interpolation between the first and second set of voice characteristics is generated. The interpolation is generated to produce a voice characteristic transition. After the voice characteristic transition is produced, the transition, text, a start time, and an end time may be received by a TTS-based synthetic DJ in block B650. Accordingly, the DJ generates a speech signal in block B660.

The foregoing description of the preferred embodiments is provided to enable any person skilled in the art to make or use the present invention. Various modifications to these embodiments are possible, and the generic principles presented herein may be applied to other embodiments as well. For instance, the modules shown in FIGS. 4 & 5 may be interconnected as separate modules or realized as one multifunctional module.

Moreover, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit.

As such, the present invention is not intended to be limited to the embodiments shown above but rather is to be accorded the widest scope consistent with the principles and novel features disclosed in any fashion herein.

What is claimed is:

1. A method for matching voice characteristics of a disc jockey, said method comprising:
   receiving, by a sound characteristic estimator, a first segment of audio signal;
   determining, by said sound characteristic estimator, a first set of sound characteristics from said first segment of audio signal;
   receiving, by said sound characteristic estimator, a second segment of audio signal;
   determining, by said sound characteristic estimator, a second set of sound characteristics from said second segment of audio signal; and
   interpolating a voice characteristic transition for said disc jockey from said first set of sound characteristics to said second set of sound characteristics between a starting time and an ending time.

2. The method according to claim 1, wherein said first segment of audio signal includes an audio signal of a song.

3. The method according to claim 1, wherein said first segment of audio signal includes an audio signal of a sports program.

4. The method according to claim 1, wherein said sound characteristics include pitch.

5. The method according to claim 1, wherein said sound characteristics include tempo.

6. The method according to claim 1, wherein said sound characteristics include volume.

7. The method according to claim 1, wherein said interpolating comprises:
   converting said first set and said second set of sound characteristics of said segments of audio signals to a corresponding first set of voice characteristics and second set of voice characteristics of said disc jockey; and
   generating an interpolation between said first set of voice characteristics and said second set of voice characteristics of said disc jockey to produce said voice characteristics transition.

8. The method according to claim 7, wherein said generating an interpolation includes generating said interpolation using a linear method.

9. The method according to claim 7, wherein said generating an interpolation includes generating a voice transition between a voice characteristic from said first set of voice characteristics and a corresponding voice characteristic from said second set of voice characteristics.

10. The method according to claim 7, wherein said voice characteristics include average pitch.

11. The method according to claim 7, wherein said voice characteristics include speaking rate.

12. The method according to claim 7, wherein said voice characteristics include loudness.

13. The method according to claim 7, wherein said voice characteristics include prosody.

14. The method according to claim 1, further comprising:
   receiving, by a synthetic disc jockey, a piece of text, said voice characteristic transition, said starting time, and said ending time; and generating, by said synthetic disc jockey using a text-to-speech engine, a speech signal with a duration from said starting time to said ending time based on said piece of text and said voice characteristic transition.

15. The method according to claim 14, further comprising choosing a sample set of voice characteristics for said synthetic disc jockey based on a genre of said first segment of audio signal.

16. The method according to claim 14, wherein said piece of text represents announcement information of a disc jockey.

17. The method according to claim 14, further comprising rendering said speech signal to generate an announcement of said synthetic disc jockey.

18. A computer-readable medium encoded with a plurality of processor-executable instruction sequences for:
   receiving, by a sound characteristic estimator, a first segment of audio signal;
   determining, by said sound characteristic estimator, a first set of sound characteristics from said first segment of audio signal;
   receiving, by said sound characteristic estimator, a second segment of audio signal;
   determining, by said sound characteristic estimator, a second set of sound characteristics from said second segment of audio signal; and
   interpolating a voice characteristic transition for said disc jockey from said first set of sound characteristics to said second set of sound characteristics between a starting time and an ending time.

19. The computer-readable medium according to claim 18, wherein said first segment of audio signal includes an audio signal of a news program.

20. The computer-readable medium according to claim 18, wherein said sound characteristics include tempo.

21. The computer-readable medium according to claim 18, wherein said interpolating comprises:
   converting said first set and said second set of sound characteristics of said segments of audio signals to a corresponding first set of voice characteristics and second set of voice characteristics of said disc jockey; and
   generating an interpolation between said first set of voice characteristics and said second set of voice characteristics of said disc jockey to produce said voice characteristics transition.

22. The computer-readable medium according to claim 21, wherein said generating an interpolation includes generating said interpolation using a linear method.

23. The computer-readable medium according to claim 21, wherein said generating an interpolation includes generating a voice transition between a voice characteristic from said first set of voice characteristics and a voice characteristic from said second set of voice characteristics.

24. The computer-readable medium according to claim 21, wherein said voice characteristics include dynamic range of pitch.

25. The computer-readable medium according to claim 18, said computer-readable medium being further encoded with processor-executable instruction sequences for:
   receiving, by a synthetic disc jockey, a piece of text, said voice characteristic transition, said starting time, and said ending time; and generating, by said synthetic disc jockey using a text-to-speech engine, a speech signal with a duration from said starting time to said ending time based on said piece of text and said voice characteristic transition.

26. A system for matching voice characteristics of a disc jockey, said system comprising:

a sound characteristic estimator, said estimator being configured to receive a first and a second segment of audio signal, and to respectively determine a first and a second set of sound characteristics from said first and second segments of audio signal; and an interpolator, said interpolator being configured to interpolate a voice characteristic transition for said disc jockey from said first set of sound characteristics to said second set of sound characteristics between a starting time and an ending time.

27. The system according to claim 26, wherein said sound characteristics include pitch.

28. The system according to claim 26, wherein said interpolator is configured to:

convert said first set and said second set of sound characteristics of said segments of audio signals to a corresponding first set of voice characteristics and second set of voice characteristics of said disc jockey; and generate an interpolation between said first set of voice characteristics and said second set of voice characteristics of said disc jockey to produce said voice characteristics transition.

29. The system according to claim 28, wherein said interpolator generates an interpolation using a linear method.

30. The system according to claim 26, further comprising:

a synthetic disc jockey, said synthetic disc jockey being configured to receive a piece of text and said voice characteristic transition; and a text-to-speech engine, wherein said synthetic disc jockey is configured to generate, using said text-to-speech engine, a speech signal with a duration from said starting time to said ending time based on said piece of text and said voice characteristic transition.

* * * * *